(No Model.)
R. E. CAVINESS & G. McCORMICK.
Corn Planter.
No. 234,243. Patented Nov. 9, 1880.
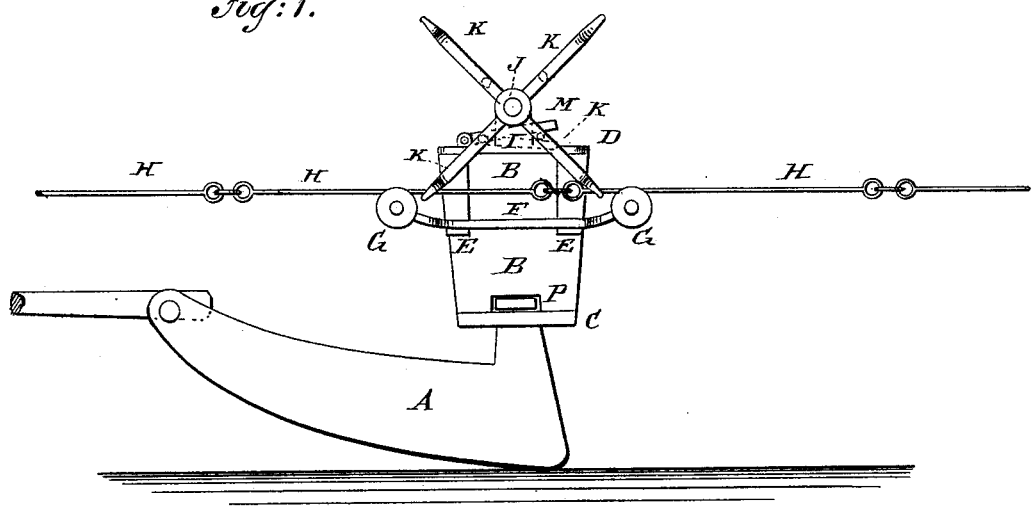
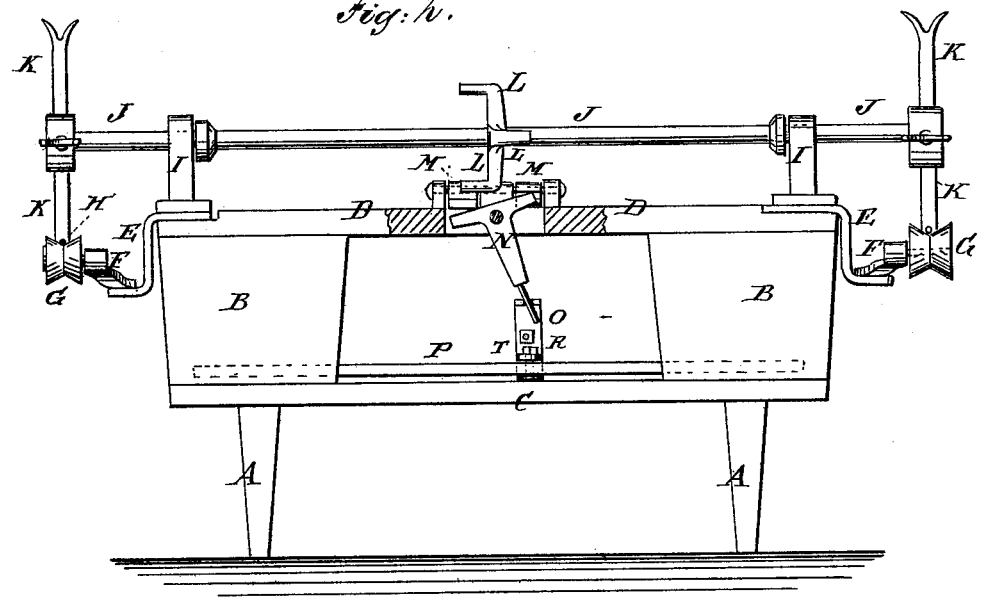
WITNESSES:
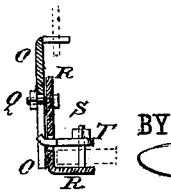
INVENTOR:
R. E. Caviness
G. McCormick
BY
ATTORNEYS.

UNITED STATES PATENT OFFICE.

RICHARD E. CAVINESS AND GEORGE McCORMICK, OF BECKWITH, IOWA.

CORN-PLANTER.

SPECIFICATION forming part of Letters Patent No. 234,243, dated November 9, 1880.

Application filed April 12, 1880. (No model.)

*To all whom it may concern:*

Be it known that we, RICHARD E. CAVINESS and GEORGE MCCORMICK, of Beckwith, in the county of Jefferson and State of Iowa, have invented a new and useful Improvement in Check-Row Corn-Planters, of which the following is a specification.

Figure 1 is a side elevation of the improvement. Fig. 2 is a rear elevation, partly in section. Fig. 3 is a sectional elevation of the seed-dropping-slide connection.

Similar letters of reference indicate corresponding parts.

The object of this invention is to furnish check-row corn-planters of the kind that are operated to drop the seed by a line stretched across the field, and which shall be simple in construction, accurate in operation, and not liable to get out of order.
A represents the runners by which the soil is opened to receive the seed, and to which are attached the seed-boxes B. The bottoms of the seed-boxes B are formed of the end parts of the board C, by which the rear parts of the runners A are connected and held at the proper distance apart. The upper parts of the seed-boxes B are connected by a board, D, the end parts of which may serve as covers to the said seed-boxes B.
To the end parts of the top board, D, or to the outer side of the seed-boxes B, are attached arms or bars E, which are bent downward and outward, and to their outer ends are attached bars F. The ends of the bars F are bent upward slightly, and to them are pivoted wheels or pulleys G, which are grooved to receive the chain or jointed wire H, which extends across the field, and the ends of which are secured to the ground by stakes. The links of the chain H are made of a length about equal to the desired distance apart of the hills, and the ends of the adjacent links are connected by small rings or links.

The chain H is made of wire and passes over the pulleys G at one or the other side of the planter, as required.

In bearings attached to the end parts of the top board, D, or to the seed-boxes B, are attached short standards or bearings I, in which revolves a shaft, J. To the ends of the shaft J are attached spoke-wheels K, each of which is formed of four spokes having their outer ends forked. The wheels K are placed directly over the bars F, so that the forked outer ends of the spokes of the said wheels K may rest upon the chain H, between the wheels or pulleys G. With this construction, as the planter is drawn forward the forked ends of the spokes K slide along the chain H until they reach and come in contact with the joints of the said chain. As each joint of the chain H comes in contact with the forked end of a spoke it turns the wheel K, and with it the shaft J, through one-quarter of a revolution, bringing the next spoke into contact with the chain H, ready to be operated upon by the next joint of the said chain.

To the middle part of the shaft J is attached a wheel, L, having four arms or spokes. The outer ends of the alternate spokes L are bent laterally at right angles and in opposite directions, as shown in Fig. 2, so that the bent ends of the spokes L will strike the bars M alternately and press them downward. The bars M are hinged at their forward ends to the board D, or to supports attached to the said board. The rear parts of the bars M rest upon the side arms of the three-armed lever N, so as to rock the said lever upon its pivot. The lever N is pivoted in a slot in the board D, and its lower arm enters a fork formed upon the upper end of the plate or bar O. The lower part of the plate O is slotted longitudinally to receive the bolt Q, by which it is secured adjustably to the plate or bar R. The lower end of the plate R is bent outward at right angles to pass beneath the seed-dropping slide P, and has a hole formed through it to receive the bolt S, which passes through the end or flange of the plate R, the seed-dropping slide P, and the clamping-plate T. The inner end of the plate T has a bent prong formed upon it, which passes through a hole in the plate R and through the slot in the plate O. By this construction the connection O R T can be adjusted as the construction of the planter to which the improvement is to be applied may require. The slide P is placed above the board C, and its ends enter the seed-boxes B, and have holes formed in them to receive the seed and drop it to the ground. With this construction, at each side of the field, as the planter is turned around and the stakes of the chain H are moved forward, the said chain H is shifted from one to the other of the spoke-wheels K. With this construction, also, the hills can be planted in accurate check-row by keeping the stakes at each side of the field in lines parallel with the cross-rows.

Having thus described our invention, we claim as new and desire to secure by Letters Patent—

1. In a seed-planter, the combination, with the seed-dropping slide P and the shaft J, rotated from the chain H, of the spoke-wheel L, having the ends of its alternate spokes bent laterally in opposite directions, the hinged bars M, the three-armed lever N, and the connection O R T, substantially as herein shown and described, whereby the seed-dropping slide P will be operated by the revolution of the shaft J, as set forth.

2. In a seed-planter, the combination, with the jointed chain H, stretched across the field, and the seed-dropping slide P, of the bars E F, the pulleys G, the spoke-wheels K, having the ends of the spokes forked, the shaft J, the spoke-wheel L, having the ends of its alternate spokes bent laterally in opposite directions, the hinged bars M, the three-armed lever N, and the connection O R T, substantially as herein shown and described.

RICHARD ELIS CAVINESS.
GEORGE McCORMICK.

Witnesses:
  ISAAC D. JONES,
  WICKLIFF M. CLARK.